US008813336B1

(12) United States Patent
Cornwall

(10) Patent No.: US 8,813,336 B1
(45) Date of Patent: Aug. 26, 2014

(54) SLEEVE COUPLING

(76) Inventor: Kenneth R. Cornwall, Duluth, GA (US)

( * ) Notice: Subject to any disclaimer, the term of this patent is extended or adjusted under 35 U.S.C. 154(b) by 599 days.

(21) Appl. No.: 12/891,119

(22) Filed: Sep. 27, 2010

Related U.S. Application Data

(63) Continuation of application No. 11/526,961, filed on Sep. 26, 2006, now Pat. No. 7,810,847.

(51) Int. Cl.
*B23P 11/00* (2006.01)
*F16L 49/00* (2006.01)
*B23P 11/02* (2006.01)

(52) U.S. Cl.
USPC ............ 29/428; 285/230; 285/64; 285/136.1; 285/189; 52/220.8; 29/450; 29/446

(58) Field of Classification Search
USPC .......... 285/64, 136.1, 139.2, 141.1, 189, 230; 52/220.8, 232; 29/428, 446, 450
See application file for complete search history.

(56) References Cited

U.S. PATENT DOCUMENTS

| 4,071,265 A * | 1/1978 | Wallace | 285/136.1 |
|---|---|---|---|
| 4,174,126 A * | 11/1979 | Hauff | 285/136.1 |
| 4,245,858 A * | 1/1981 | Cox | 285/136.1 |
| 4,540,310 A * | 9/1985 | Ditcher et al. | 404/25 |
| 5,261,761 A * | 11/1993 | Knappert et al. | 404/25 |
| 5,293,724 A * | 3/1994 | Cornwall | 52/220.8 |
| 5,297,817 A * | 3/1994 | Hodges | 285/15 |
| 5,299,836 A * | 4/1994 | Woods | 285/42 |
| 6,102,442 A * | 8/2000 | Gretz | 285/40 |
| 6,305,133 B1 * | 10/2001 | Cornwall | 52/232 |
| 6,336,297 B1 * | 1/2002 | Cornwall | 52/232 |
| 6,405,502 B1 * | 6/2002 | Cornwall | 52/220.8 |
| 6,470,635 B2 * | 10/2002 | Cornwall | 52/220.8 |
| 6,558,044 B1 * | 5/2003 | Chen | 385/70 |
| 6,792,726 B1 * | 9/2004 | Price | 52/220.8 |
| 7,080,486 B2 * | 7/2006 | Radke et al. | 52/98 |
| 7,810,847 B1 * | 10/2010 | Cornwall | 285/230 |
| 8,001,737 B1 * | 8/2011 | Price | 52/220.8 |
| 8,191,330 B1 * | 6/2012 | Cornwall | 52/741.4 |
| 2002/0032996 A1 * | 3/2002 | Cornwall | 52/220.8 |
| 2004/0016190 A1 * | 1/2004 | Radke et al. | 52/232 |

FOREIGN PATENT DOCUMENTS

| JP | 10299112 A | * | 11/1998 | E04B 1/684 |
|---|---|---|---|---|
| JP | 3167433 U | * | 4/2011 | E04B 1/684 |
| JP | 2012193759 A | * | 10/2012 | F16L 55/16 |
| KR | 2006055480 A | * | 5/2006 | E02D 29/02 |
| KR | 100944335 B1 | * | 3/2010 | H02G 3/22 |

OTHER PUBLICATIONS

English machine translation of JP 10299112.*

* cited by examiner

*Primary Examiner* — Essama Omgba
(74) *Attorney, Agent, or Firm* — Mary M. Moyne; Fraser, Trebilcock, Davis & Dunlap, P.C.

(57) ABSTRACT

A waterproof sleeve coupling for use in a partition for preventing liquid from leaking through a penetration in the partition either adjacent to or through the sleeve coupling. The sleeve coupling has a water stop constructed of a resilient material and mounted in sealing contact with a sleeve so that a waterproof seal is formed between the water stop and the sleeve. The sleeve coupling optionally includes an extension coupling and an extension sleeve mounted on the sleeve. When the sleeve coupling is mounted in the partition, the extension sleeve extends beyond the surface of the partition to prevent liquid on the surface of the partition from leaking into the passageway of the sleeve coupling.

13 Claims, 3 Drawing Sheets

SLEEVE COUPLING

CROSS REFERENCES TO RELATED APPLICATIONS

This is a continuation of U.S. application Ser. No. 11/526,961 filed on Sep. 26, 2006 which is hereby incorporated herein by reference in its entirety, except that the present application supersedes any portion of the above referenced application which is inconsistent with the present application.

STATEMENT REGARDING FEDERALLY SPONSORED RESEARCH OR DEVELOPMENT

Not Applicable

BACKGROUND OF THE INVENTION (1) Field of the Invention

The present invention relates to a sleeve coupling which enables waterproof penetration through a partition. In particular, the present invention relates to a sleeve coupling for use in a partition which has a flexible water stop which prevents water from passing through the partition adjacent to or through the sleeve coupling.

(2) Description of Related Art

Because of the ever-increasing use of sprinklers in almost all buildings, particularly multi-story buildings, the need for a penetration through a partition such as a floor or wall to be waterproof is becoming equally as important as the need for the penetration to be fireproof. In addition to the direct damage caused by the water leaking through the penetration, concealed water leakage in walls and drop ceilings is conducive to mold. Insurance coverage for mold claims is a very serious problem for the building industry.

In the past, to prevent the leakage of water through a penetration around a coupling sleeve in a floor, a waterproof coating seal was applied to the entire floor. Another way to prevent the leakage of water through a penetration around a coupling sleeve was to apply a waterproof caulk around the coupling sleeve. However, both of these methods of waterproofing are subject to human error during the sealing or caulking process and required an extra step in the installation process. Another issue with the waterproofing of penetrations through partitions is associated with the expansion and contraction of rigid water stops and the expansion and contraction of the partition material surrounding the water stops. This is particularly an issue with poured concrete floors. The sleeve and water stops contract and expand depending on the temperature at the time of pouring and the internal temperature of the uncured concrete. The concrete contracts during the curing process. The combination of these forces can cause cracking around the rigid water stop and the concrete which can lead to leakage on the outside of the sleeve through the concrete floor.

The related art has shown various pass-through devices for use in partitions such as walls, floors, roofs, etc. for allowing plumbing pipes or electrical conduits to pass through the partitions. Illustrative are U.S. Pat. Nos. 4,623,170; 6,305,133; 6,336,297; 6,405,502 and 6,470,635 all to Applicant.

U.S. Pat. No. 6,792,726 to Price also shows a pass-through device for pipes and conduits for use in floors, walls and roofs. The device includes an upper and lower sleeve with a resilient member spaced between the ends of the sleeves. The resiliency of the resilient member allows for expansion of the floor, wall or roof without damaging the device.

There remains the need for a sleeve coupling for providing a penetration through a partition which is waterproof, easy to install and which accommodates expansion and contraction of the partition and the sleeve coupling without compromising the waterproofing ability of the sleeve coupling.

BRIEF SUMMARY OF THE INVENTION

A sleeve coupling for use in a partition for preventing liquid from leaking through the penetration in the partition either around or through the sleeve coupling. The sleeve coupling includes a sleeve and a water stop. The water stop is mounted around the outer surface of the sleeve. The water stop is mounted in sealing contact with the outer surface of the sleeve so that a waterproof seal is formed between the water stop and the sleeve. The sealing contact between the water stop and the outer surface of the sleeve prevents liquid from passing between the water stop and the sleeve along the outer surface of the sleeve. The water stop is constructed of a resilient or flexible material so that the water stop is not damaged by the expansion and contraction of the partition or the sleeve. The resilient nature of the water stop enables the water stop to maintain sealing contact with the outer surface of the sleeve during expansion and contraction of the partition or the sleeve. The water stop has a flange at one end which extends outward away from the sleeve. The larger diameter of the flange moves the liquid leaking through the penetration in the partition on or adjacent to the outer surface of the sleeve away from the sleeve. This reduces the amount of liquid directly adjacent the water stop and sleeve interface which reduces the likelihood of liquid breaking the seal formed at the interface. In one (1) embodiment, the flange is at the top end of the water stop and the top end of the water stop is adjacent the top end of the sleeve.

Optionally, the sleeve coupling can also include an extension coupling and an extension sleeve. The extension coupling is mounted on the top end of the sleeve. The extension sleeve is mounted in the extension coupling and extends outward from the extension coupling in a direction away from the sleeve. The extension coupling and extension sleeve have inner bores which align with the inner bore of the sleeve to form the passageway of the sleeve coupling. The extension coupling and extension sleeve enable the sleeve coupling to extend outward beyond the surface of the partition. In one (1) embodiment, the sleeve coupling is mounted in the partition so that the sleeve, water stop and extension coupling are completely within the partition with the top end of the extension coupling flush with the surface of the partition and with the extension sleeve extending beyond the surface of the partition. The added height or length of the extension sleeve prevents liquid on the surface of the partition from leaking into the passageway of the sleeve coupling and thus, prevents liquid from passing through the partition by way of the passageway of the sleeve coupling.

In one (1) embodiment, the inner passage of the extension sleeve at the end opposite the extension coupling is tapered such that the inner diameter of the top end of the extension sleeve is less then the inner diameter of the remainder of the extension sleeve and the passageway of the sleeve. The tapered top end of the extension sleeve enables mounting of the pass-through pipe in the sleeve coupling without the need for a riser clamp. In one (1) embodiment, solvent cement is used to secure the pass-through pipe in the extension sleeve.

In one (1) embodiment, an outer mounting sleeve is used to secure the sleeve coupling to a form or structure for the partition. The outer mounting sleeve can include a firestop material such as an intumescent material which allows the sleeve coupling to also act as a firestop.

The present invention relates to a sleeve coupling for use in a partition, which comprises, a sleeve having a first end and a second end with a sidewall having an outer surface and an inner surface extending therebetween and having a passageway extending between the ends, and a water stop constructed of a resilient material and positioned on and in sealing contact with the outer surface of the sidewall of the sleeve between the first and second ends of the sleeve so that, in use when the sleeve expands and contracts, the water stop remains in sealing contact with the sleeve and prevents liquid from moving between the water stop and the outer surface of the sidewall of the sleeve.

Further, the present invention relates to a water stop for use with a sleeve to provide a waterproof sleeve coupling for a partition, which comprises, a sidewall constructed of a resilient material and having opposed ends with an inner bore extending therebetween and configured to be mounted on the sleeve in sealing contact with the outer surface of the sleeve so that the sleeve extends through the inner bore and so that a waterproof seal is formed between the outer surface of the sleeve and an inner surface of the sidewall, and a flange constructed of a resilient material mounted on the sidewall and extending outward from the sidewall in a direction opposite the inner bore.

Still further, the present invention relates to a method for installing a sleeve coupling in a partition to provide a waterproof penetration which comprises the steps of, providing a sleeve having opposed ends with a sidewall having an outer surface extending therebetween and having a passageway extending between the ends, providing a water stop constructed of a resilient material and having an inner bore with an inner surface, mounting the water stop on the outer surface of the sleeve so that the sleeve extends through the inner bore of the water stop and the outer surface of the sleeve is in sealing contact with the inner surface of the water stop, mounting the sleeve and the water stop in the partition so that the water stop is completely within the partition wherein the sealing contact between the outer surface of the sleeve and the inner surface of the water stop prevents liquid from moving through the partition between the outer surface of the sleeve and the inner surface of the water stop.

Further still, the present invention relates to a method for preventing liquid from moving through a partition along a sleeve mounted in the partition, which comprises the steps of, providing a sleeve having opposed ends with a sidewall having an outer surface extending therebetween and having a passageway extending between the ends, providing a water stop constructed of a resilient material and having an inner bore with an inner surface, mounting the water stop on an outer surface of the sleeve so that the sleeve extends through the water stop and the outer surface of the sleeve is in sealing contact with the inner surface of the water stop, and mounting the sleeve and the water stop in the partition so that the water stop is completely within the partition wherein the sealing contact between the outer surface of the sleeve and the water stop prevents liquid from moving through the partition between the outer surface of the sleeve and the inner surface of the water stop.

The substance and advantages of the present invention will become increasingly apparent by reference to the following drawings and the description.

DETAILED DESCRIPTION OF THE INVENTION

Figure 1:
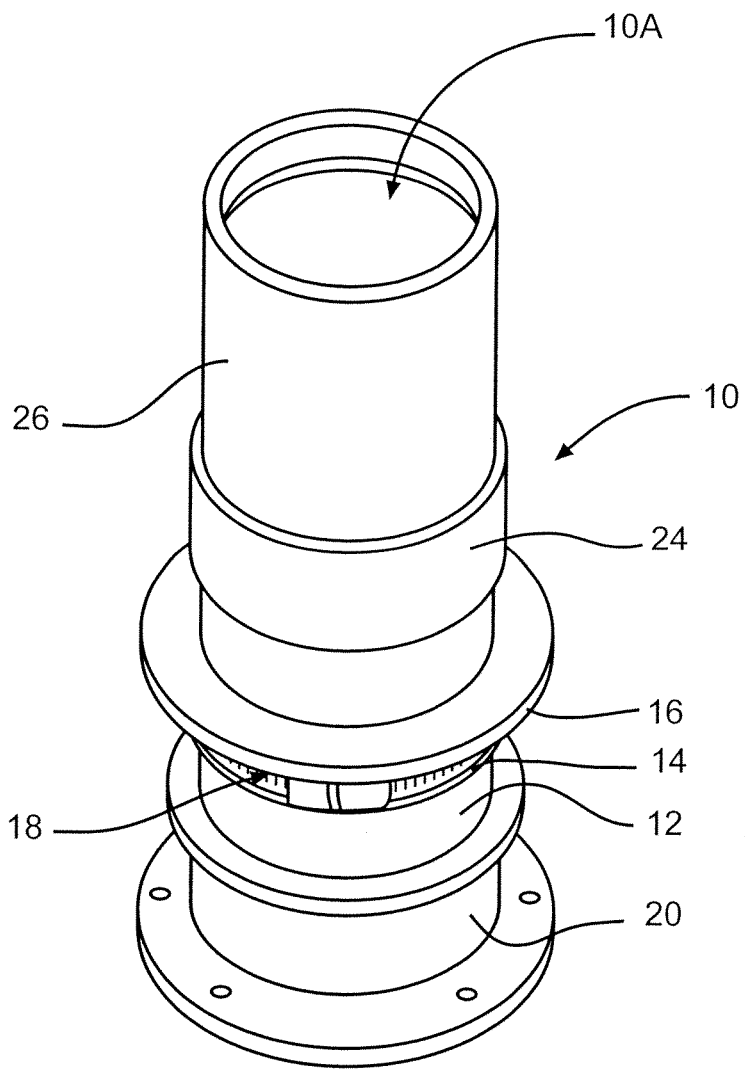
FIG. 1 is a perspective view of the sleeve coupling 10.
Figure 2:
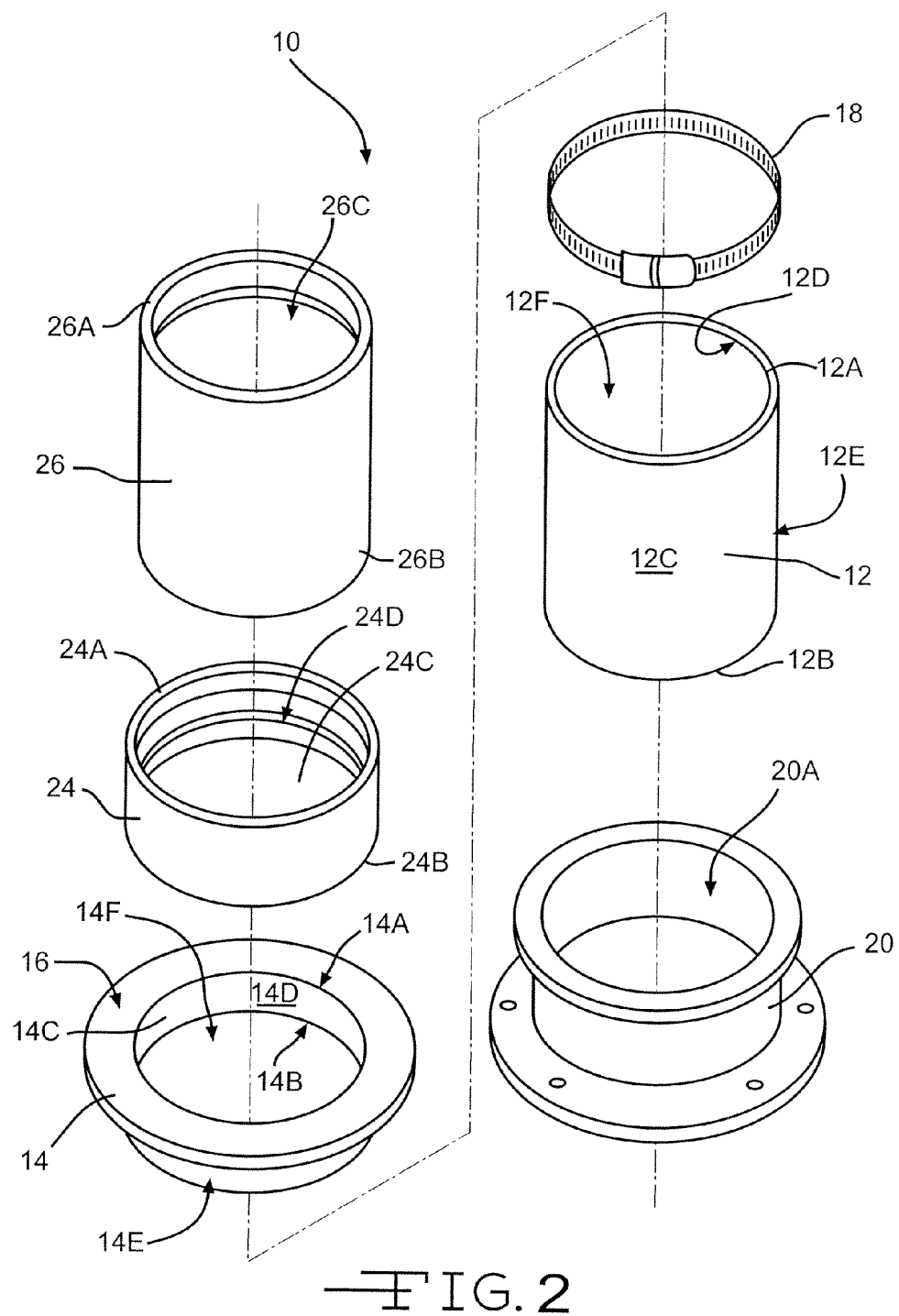
FIG. 2 is an exploded view of one (1) embodiment of the sleeve coupling 10.

FIG. 1 shows the waterproof sleeve or sleeve coupling 10 of the present invention. The waterproof sleeve coupling 10 is installed in a partition 100 and has a passageway 10A which provides a pass-through or penetration through the partition 100 so that electrical, mechanical, plumbing, environmental and communication systems can be easily passed through the partition 100. The partition 100 can be a wall, floor, roof or any other part of a structure through which a penetration or pass-through is needed.

In one (1) embodiment, the sleeve coupling 10 includes a sleeve 12 and a water stop 14. The sleeve 12 has opposed top and bottom ends 12A and 12B with a sidewall 12C extending therebetween. The sleeve 12 is hollow and the sidewall 12C has an inner surface 12D and an outer surface 12E. The inner surface 12D forms an inner bore 12F which extends between the ends 12A and 12B and forms the passageway 10A along the longitudinal axis A-A of the sleeve coupling 10. In one (1) embodiment, the sleeve 12 is similar to standard plumbing piping and has a cylindrical shape with a cylindrical inner bore 12F. In one (1) embodiment, the sleeve 12 is constructed of PVC. The size or diameter of the inner bore 12F of the sleeve 12 depends on the number and type of piping, conduit or cables to be passed through the sleeve coupling 10. The length of the sleeve 12 between the ends 12A and 12B depends on the thickness of the partition 100. In one (1) embodiment, the ends 12A and 12B of the sleeve 12 do not extend beyond the partition 100 so that the sleeve 12 is completely encased in the partition 100.

Figure 3:
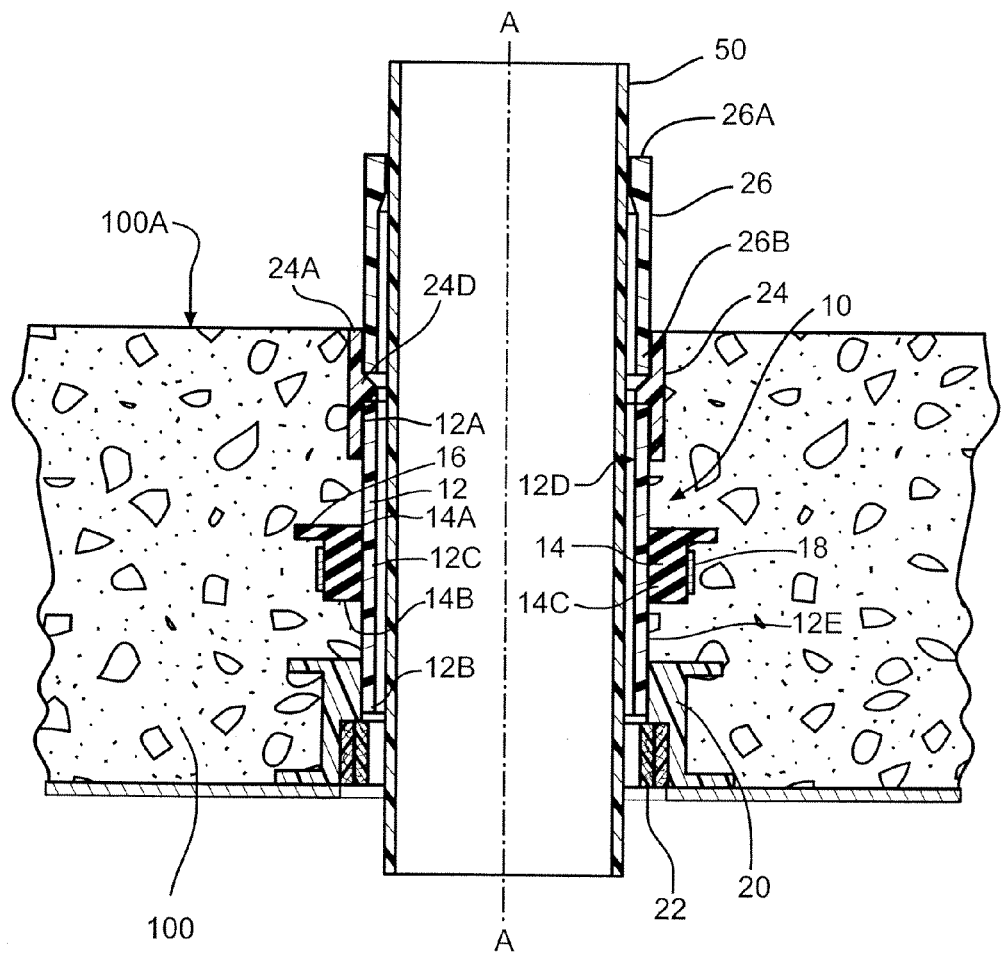
FIG. 3 is a cross-sectional view of the sleeve coupling 10 installed in a partition 100.

The water stop 14 is secured around the outer surface 12E of the sleeve 12 between the ends 12A and 12B of the sleeve 12. In one (1) embodiment, the position of the water stop 14 is adjustable along a length of the sleeve 12 prior to mounting of the sleeve 12 in the partition 100. The water stop 14 has opposed top and bottom ends 14A and 14B with a sidewall 14C extending therebetween. The sidewall 14C of the water stop 14 has an inner and outer surface 14D and 14E with the inner surface 14D forming an opening or inner bore 14F extending between the ends 14A and 14B. The sleeve 12 extends through the inner bore 14F of the water stop 14. The size and shape of the inner bore 14F are similar to the size and shape of the outer surface 12E of the sleeve 12. A flange 16 extends outward from the outer surface 14E of the sidewall 14C in a direction away from the inner bore 14F. In one (1) embodiment, the flange 16 extends outward essentially perpendicular to the longitudinal axis A-A of the sleeve coupling 10 (FIG. 3). The flange 16 extends outward beyond the sleeve 12 and beyond the extension coupling 24 when present. In one (1) embodiment, the flange 16 has a circular shape and a diameter of the flange 16 is greater than a diameter of the sleeve 12 and the extension coupling 24 when present. In one (1) embodiment, the flange 16 is at one (1) end of the water stop 14. In one (1) embodiment, the flange 16 is at the top end 14A of the water stop 14 adjacent the top end 12A of the sleeve 12. The water stop 14 is constructed of a flexible material. In one (1) embodiment, the water stop 14 is constructed of a resilient material. In one (1) embodiment, the water stop 14 is constructed of an elastomer. In one (1) embodiment, the sidewall 14C and flange 16 of the water stop 14 are constructed as a unitary piece.

The water stop 14 may be secured to the outer surface 12E of the sleeve 12 by any well known means. In one (1) embodiment, the size and shape of the inner bore 14F of the water stop 14 are such that the water stop 14 is closely fit around the outer surface 12E of the sleeve 12. In one (1) embodiment, the inner bore 14F is slightly smaller in size than the outer surface 12E of the sleeve 12. In this embodiment, to secure the water stop 14 on the sleeve 12, the inner bore 14F is expanded to accommodate the sleeve 12 and the water stop 14 is moved onto the sleeve 12 to a correct position along the sleeve 12. The inner bore 14F then returns to the original size and shape which secures the water stop 14 on the sleeve 12 by a friction fit.

In one (1) embodiment, the inner surface 14D of the sidewall 14C of the water stop 14 is secured by an adhesive to the outer surface 12E of the sleeve 12. In one (1) embodiment, the water stop 14 is solvent welded to the sleeve 12. In another embodiment, a securing band 18 is positioned around the outer surface 14E of the sidewall 14C of the water stop 14 (FIG. 3). When the water stop 14 is correctly positioned on the sleeve 12, the band 18 is tightened which secures the water stop 14 to the sleeve 12. The water stop 14 is secured to the sleeve 12 so that a waterproof seal is formed between the outer surface 12E of the sleeve 12 and the inner surface 14D of the sidewall 14C of the water stop 14 so that no liquid may pass between the outer surface 12E of the sleeve 12 and the inner surface 14D of the water stop 14.

In one (1) embodiment, the waterproof sleeve coupling 10 includes the sleeve 12 and water stop 14 and an outer mounting sleeve 20 connected to the sleeve 12. The outer mounting sleeve 20 allows for securing the waterproof sleeve coupling 10 to the partition 100. In one (1) embodiment, the outer mounting sleeve 20 is mounted on the bottom end 12B of the sleeve 12. The outer mounting sleeve 20 has an inner bore 20A which is aligned with the inner bore 12F of the sleeve 12 to provide the passageway 10A for the waterproof sleeve coupling 10. The outer mounting sleeve 20 can be of any type well known in the art. The outer mounting sleeve 20 can be connected to the sleeve 12 by any well known means. In one (1) embodiment, the inner bore 20A of the outer mounting sleeve 20 is provided with a firestop material 22 (FIG. 3). In this embodiment, the waterproof sleeve coupling 10 also acts as a firestop. In one (1) embodiment, the firestop material 22 is an intumescent material well known in the art. In one (1) embodiment, the outer mounting sleeve 20 is similar to the outer sleeve described in U.S. Pat. No. 6,305,133 to Applicant.

Optionally, the waterproof sleeve coupling 10 also includes an extension coupling 24 and an extension sleeve 26 mounted on the top end 12A of the sleeve 12. The extension coupling 24 has opposed top and bottom ends 24A and 24B with an inner bore 24C extending therebetween. The extension coupling 24 is mounted on the top end 12A of the sleeve 12 such that the top end 12A of the sleeve 12 extends into the bottom end 24B of the extension coupling 24. In one (1) embodiment, the inner bore 24C of the extension coupling 24 has an inner ridge 24D which limits the depth of insertion of the top end 12A of the sleeve 12 into the extension coupling 24. The extension sleeve 26 has top and bottom ends 26A and 26B with an inner bore 26C extending therebetween. The bottom end 26B of the extension sleeve 26 is mounted in the inner bore 24C of the extension coupling 24 at the top end 24A of the extension coupling 24 opposite the sleeve 12. The extension sleeve 26 extends outward from the extension coupling 24 in a direction away from the sleeve 12. The extension coupling 24 and extension sleeve 26 are mounted on the sleeve 12 so that the inner bore 12F of the sleeve 12 and the inner bores 24C and 26C of the extension coupling 24 and the extension sleeve 26 are aligned and form the passageway 10A for the waterproof sleeve coupling 10. In one (1) embodiment, at the top end 26A of the extension sleeve 26, the inner bore 26C is tapered such that the inner diameter of the extension sleeve 26 at the top end 26A is less than the inner diameter of the remainder of the extension sleeve 26. The tapered inner bore 26C enables the pass-through pipe 50 to be easily secured to the extension sleeve 26 such as through the use of an adhesive or solvent cement. Tapering only a portion of the inner bore 26C at the top end 26A of the extension sleeve 26 allows for easy insertion of the pass-through pipe 50 through the sleeve coupling 10 including the extension sleeve 26. In one (1) embodiment, only the top, 0.75 inch (19.05 mm) of the inner bore 26C of the extension sleeve 26 is tapered.

In one (1) embodiment where the partition 100 is concrete and the partition 100 is a floor, to mount the waterproof sleeve coupling 10 in the partition 100, the outer mounting sleeve 20, if present, is connected or secured to a substrate or deck for the partition 100. Next, a cap (not shown) is secured over the top end 12A of the sleeve 12 or the top end 24A of the extension coupling 24, if present. The cap prevents the partition material from entering the passageway 10A of the waterproof sleeve coupling 10. Next, the partition material is poured around the waterproof sleeve coupling 10 and allowed to cure. The water stop 14 is secured in position on the sleeve 12 before the waterproof sleeve coupling 10 is secured in the partition 100. In one (1) embodiment, the waterproof sleeve coupling 10 does not extend beyond the partition 100. In one (1) embodiment where an extension coupling 24 is mounted on the top end 12A of the sleeve 12, the top end 24A of the extension coupling 24 is flush with the surface 100A of the partition 100 so that when the extension sleeve 26 is mounted in the top end 24A of the extension coupling 24, the extension sleeve 26 extends beyond the surface 100A of the partition 100. In one (1) embodiment, the extension sleeve 26 extends at least 2.0 inches (50.8 mm) beyond the surface 100A of the partition 100. Once the sleeve coupling 10 is mounted in the partition 100, the pass-through pipe 50 is extended through the sleeve coupling 10 and thus, the partition 100. In one (1) embodiment, the pass-through pipe 50 is inserted from the bottom of the sleeve coupling 10 and up through the extension sleeve 26, if present. The pass-through pipe 50 can be secured in the sleeve coupling 10 by any well known means. In one (1) embodiment, solvent cement is used to secure the pass-through pipe 50 to the sleeve coupling 10. In one (1) embodiment, where the sleeve coupling 10 includes an extension sleeve 26, the pass-through pipe 50 is secured to the extension sleeve 26 by solvent cement. In one (1) embodiment, a riser clamp (not shown) is used to secure the pass-through pipe 50 in the sleeve coupling 10. In an embodiment where the outer diameter of the pass-through pipe 50 is significantly less than the diameter of the passageway 10A of the sleeve coupling 10 or where multiple pass-through pipes 50 extend through the sleeve coupling 10, a plug (not shown) may be inserted into the top end 26A of the extension sleeve 26 or the top end 12A of the sleeve 12 and the pass-through pipes 50 are extended through the holes in the plug and are secured to the plug or held in place in the plug by friction fit.

The flexible nature of the water stop 14 enables the water stop 14 to flex and move to accommodate the contraction and expansion of the partition 100 and the sleeve 12, thus enabling a waterproof seal to be maintained between the outer surface 12E of the sleeve 12 and the water stop 14. The flexible nature of the water stop 14 prevents the water stop 14 from cracking or becoming damaged during expansion and contraction of the partition 100 or the sleeve 12. The water stop 14 prevents the flow of liquid through the partition 100 adjacent the outer surface 12E of the sleeve 12. The flange 16 of the water stop 14 moves the liquid away from the sleeve 12 to further reduce the possibility of the liquid leaking between the outer surface 12E of the sleeve 12 and the inner surface 14D of the sidewall 14C of the water stop 14.

When the waterproof sleeve coupling 10 includes the extension coupling 24 and extension sleeve 26, the additional height or length of the extension sleeve 26 prevents liquid on the surface 100A of the partition 100 from entering the passageway 10A of the waterproof sleeve coupling 10 until the level of liquid on the surface 100A of the partition 100 adjacent the waterproof sleeve coupling 10 is greater than the height of the extension sleeve 26 above the surface 100A.

In the foregoing description, various features of the present invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are here by incorporated by reference herein in their entirety, with each claim standing on its own as a separate embodiment of the present invention.

It is intended that the foregoing description be only illustrative of the present invention and that the present invention be limited only by the hereinafter appended claims.

I claim:

1. A sleeve coupling for use in a partition, which comprises:
   (a) a sleeve having a first end and a second end with a sidewall having an outer surface extending therebetween and having a passageway extending between the ends;
   (b) an extension coupling having opposed ends mounted on one end of the sleeve;
   (c) a sleeve extension connected to the extension coupling on the end of the extension coupling opposite the sleeve; and
   (d) a water stop constructed of a resilient material having an inner bore with an inner surface and positioned on the sleeve between the first and second ends of the sleeve so that the sleeve extends through the inner bore of the water stop and the outer surface of the sleeve is in sealing contact with the inner surface of the water stop, wherein in use when the sleeve and the water stop are mounted in the partition with the water stop completely within the partition and the end of the extension coupling opposite the sleeve flush with a surface of the partition so that the sleeve extension extends beyond the surface of the partition, the water stop remains in sealing contact with the sleeve and prevents liquid from moving between the water stop and the outer surface of the sidewall of the sleeve and the sleeve extension prevents liquid on the surface of the partition from moving through the partition along the sleeve coupling.

2. The sleeve coupling of claim 1 wherein the water stop has opposed ends with a sidewall extending therebetween and a flange extending outward from the sidewall of the water stop in a direction away from the sleeve.

3. The sleeve coupling of claim 2 wherein the flange is positioned at one end of the water stop.

4. The sleeve coupling of claim 1 wherein the water stop is a separate piece from the sleeve and is adjustable along a length of the outer surface of the sidewall of the sleeve between the ends of the sleeve so that in use, when the sleeve is mounted in the partition, the water stop can be at any position along the length of the outer surface of the sidewall of the sleeve in the partition.

5. The sleeve coupling of claim 1 wherein an extension coupling is mounted on a first end of the sleeve.

6. The sleeve coupling of claim 5 wherein an outer diameter of the water stop is greater than an outer diameter of the extension coupling and an outer diameter of the sleeve.

7. The sleeve coupling of claim 1 wherein an outer mounting sleeve is mounted on the second end of the sleeve spaced apart from the water stop.

8. A method for installing a sleeve coupling in a partition to provide a waterproof penetration, which comprises the steps of:
   (a) providing a sleeve having opposed ends with a sidewall having an outer surface extending therebetween and having a passageway extending between the ends;
   (b) providing an extension coupling having opposed ends mounted on one end of the sleeve;
   (c) providing a sleeve extension connected to the extension coupling on the end of the extension coupling opposite the sleeve;
   (d) providing a water stop constructed of a resilient material and having an inner bore with an inner surface;
   (e) mounting the water stop on the outer surface of the sleeve so that the sleeve extends through the inner bore of the water stop and the outer surface of the sleeve is in sealing contact with the inner surface of the water stop; and
   (f) mounting the sleeve and the water stop in the partition so that the water stop is completely within the partition and the end of the extension coupling opposite the sleeve is flush with a surface of the partition, and so that the sleeve extension extends beyond the surface of the partition wherein the sealing contact between the outer surface of the sleeve and the inner surface of the water stop prevents liquid from moving through the partition between the outer surface of the sleeve and the inner surface of the water stop and the sleeve extension prevents liquid on the surface of the partition from moving through the partition along the sleeve coupling.

9. The method of claim 8 wherein further in step (f), the sleeve expands and contracts in the partition, and wherein when the sleeve expands and contracts the water stop expands and contracts to maintain the sealing contact between the outer surface of the sleeve and the inner surface of the water stop.

10. The method of claim 8 wherein further in step (f), the partition expands and contracts, and wherein when the partition expands and contracts, the water stop expands and contracts to maintain the sealing contact between the outer surface of the sleeve and the inner surface of the water stop.

11. The method of claim 8 wherein further in step (f), the partition expands and contracts, and wherein when the partition expands and contracts, the water stop expands and contracts and maintains the sealing contact between the outer surface of the sleeve and the inner surface of the water stop.

12. The method of claim 8 wherein an outer mounting sleeve is provided, wherein further in step (e), the outer mounting sleeve is mounted on one end of the sleeve spaced apart from the water stop, and wherein in step (f), the outer mounting sleeve is secured to a substrate of the partition to assist in mounting the sleeve and water stop in the partition.

13. The method of claim 8 wherein further in step (f), the sleeve is positioned in the partition such that the ends of the sleeve are spaced apart from opposed surfaces of the partition.

\* \* \* \* \*